UNITED STATES PATENT OFFICE.

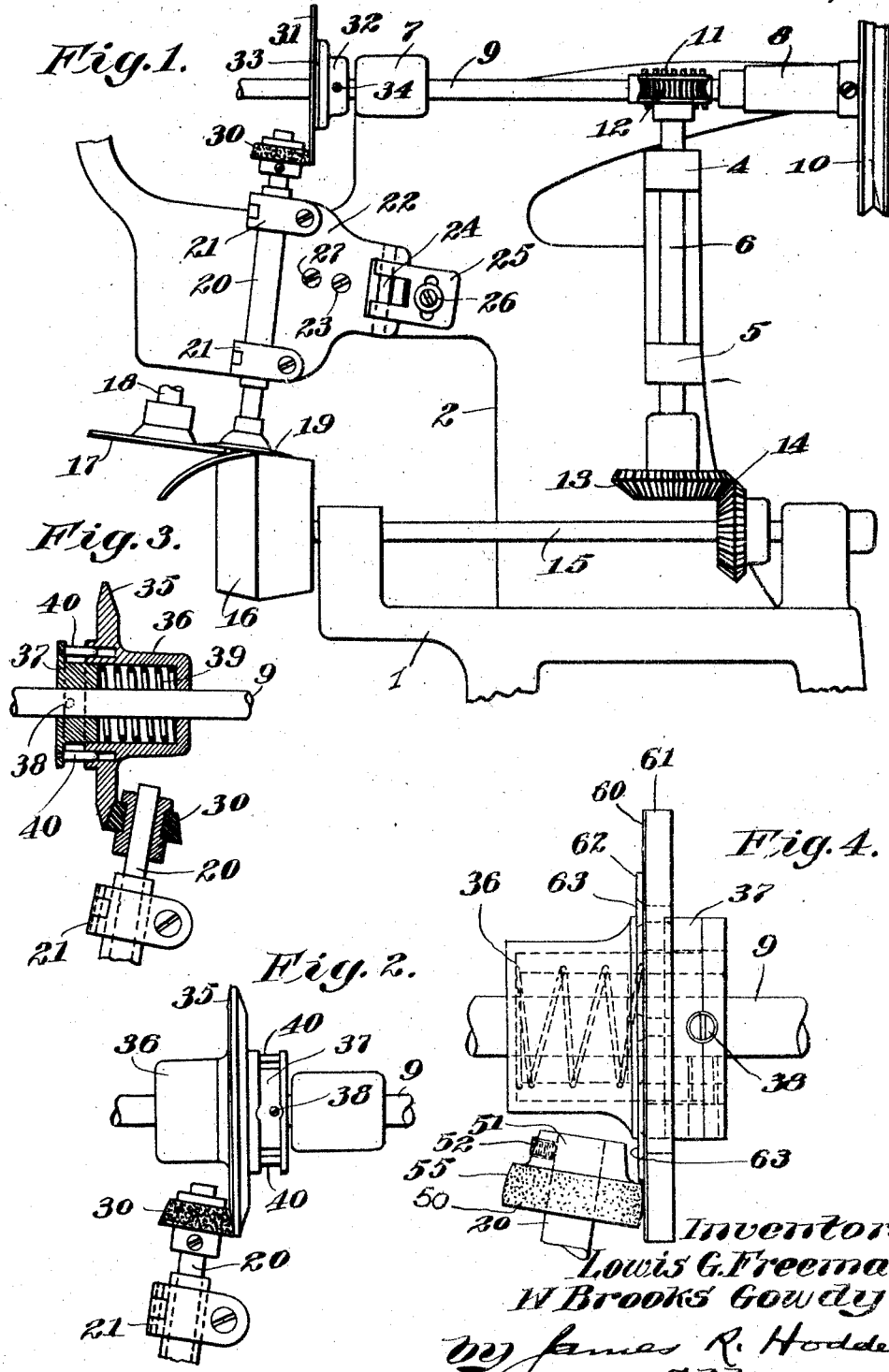

W BROOKS GOWDY, OF PORTSMOUTH, AND LOUIS G. FREEMAN, OF CINCINNATI, OHIO.

FRICTION-DRIVE FOR SKIVING-MACHINES.

1,367,041.   Specification of Letters Patent.   Patented Feb. 1, 1921.

Application filed August 21, 1919. Serial No. 319,024.

*To all whom it may concern:*

Be it known that we, W BROOKS GOWDY and LOUIS G. FREEMAN, both citizens of the United States, and residents of Portsmouth and Cincinnati, Ohio, respectively (whose post-office addresses are, respectively, Portsmouth, Ohio, and 909 Sycamore street, Cincinnati, Ohio), have invented an Improvement in Friction-Drives for Skiving-Machines, of which the following description, in connection with the accompanying drawings, is a specification, like letters on the drawings representing like parts.

Our present invention is an improvement in that type of leather cutting or skiving machines used in the manufacture of boots and shoes known as an Amazeen skiver, and the object of the invention is to improve and perfect machines of this type. In such skiving machines it is necessary to adjust angularly the shaft carrying the rotating cutting or skiving knife relatively to the feeding means, from time to time, and this necessity has caused great difficulty in securing a satisfactory driving connection between said adjustable shaft and the main or power shaft of the machine. Heretofore the driving connection from the power shaft to the spindle carrying the skiving knife or cutter has usually been made by beveled or miter pinions or gears, but the binding of the gears at certain adjustments, the noise therefrom and the rapid wear have proven to be very objectionable, both from the mechanical standpoint, and also from that of the operator, who must necessarily be close to the machine when running it. For the purpose of overcoming these difficulties, attempts have been made to use a belt drive, but such attempts have not proven satisfactory due to the small diameters of the pulleys required and to the adjustment which the cutter shaft must have.

Our present invention provides a noiseless friction driving mechanism which permits the desired range of angular adjustment without affecting the driving action between the power shaft and the knife spindle and which provides at all times, an effective driving connection. After numerous experiments in this line, we have discovered that by using a cork driving surface and a yieldingly mounted friction disk, we secure a noiseless, cheap, nonslipping, driving connection, permitting a range of angular adjustments and suitable for use upon the small diameters of driving parts required in this type of machine.

We find that cork possesses many advantages for this purpose over leather, rubber or the like, both of the latter wearing out quickly in this work and becoming hard, dried and unsuitable. The cork can be glued and securely held in a hub of small diameter, or upon the face of the friction disk, can be easily renewed, does not polish the metal surface in contact with it and seems peculiarly suited for this work. In coöperation with a yieldingly actuated friction disk it gives a most satisfactory driving connection. We are aware that friction driving mechanisms are old, but in the special type of machine herein described and illustrated, where great advantage is possessed by a construction which is substantially noiseless and which will permit a considerable range of angular adjustments, we believe that the use of such a drive as we have devised is distinctly new and therefore, we wish to claim the same in this combination broadly.

Referring to the drawings, illustrating a preferred embodiment of the invention, Figure 1 is a side view of part of the well-known type of Amazeen skiving machine;

Fig. 2 is a side view illustrating a right hand friction drive with the knife or cutter running in the direction in which it is generally used;

Fig. 3 is a vertical cross sectional view, illustrating the friction driving connection reversely arranged; and Fig. 4 shows a modification of our improved device.

Referring to the drawings, the machine shown comprises a base 1 and a standard 2 carrying bearings 4 and 5 for a vertical shaft 6 and also carrying bearings 7 and 8 for the main power shaft 9. This shaft is provided with a pulley 10 to enable it to be belted to any convenient source of power, and it carries a worm 11 meshing with a worm wheel 12, fast on the upper end of the vertical shaft 6. The lower end of this shaft carries a miter gear 13 which meshes with a similar gear 14 on a shaft 15 which carries the feed wheel 16.

Coöperating with the feed wheel 16 is a rotary feed disk 17 mounted on a spindle 18 which is supported and driven in a manner well understood by those skilled in this art. These supporting and driving means are not illustrated herein. The rotary knife or cutter 19 is mounted on the lower end of a shaft 20 supported in bearings 21 that are carried by a bracket 22 which is adjustable both on a pivot bolt 23 threaded in the standard 2 and also on a pivot 24 carried by a hinge member 25. This member is slotted to receive a screw 26 that is threaded into the standard and serves to secure the bracket 22 in an adjustable position. A thrust screw 27 threaded in the bracket 22 bears against the face of the standard 2 and serves to swing the bracket more or less about the pivot 24 and secure it in its adjusted position. This construction thus permits the angular adjustment of the cutter shaft 20 in two planes at right angles to each other.

The driving mechanism of the cutter shaft 20 consists of a cork faced friction pulley 30, secured to the upper end of the shaft 20 and bearing against the face of a friction disk 31, which is secured to a collar or hub 32 that is fastened to the main driving shaft 9.

The disk itself preferably is made of resilient metal so that it can spring or bend slightly where it comes in contact with the cork face of the pulley 30 and thus effect a yielding frictional contact with the cork faced pulley. The hub 32 is secured to a shaft 9 by means of a set screw 34, so that as the angular adjustment of the shaft 20 is changed, the hub 32 carrying the disk 31 can be set forward or backward slightly as required to maintain a substantially uniform frictional engagement with the pulley at all times.

This construction provides a substantially non-slipping transmission between the shafts 9 and 20 which operates with a uniform efficiency at all positions of the relative angular adjustment of the shafts. The yielding tension of the friction disk bearing against the cork surface seems to prevent undue wear and eliminates the noise which has proven so objectionable in other types of drives.

In the arrangement shown in Figs. 2 and 3, a different construction is employed to provide the yielding engagement between the friction disk and the cork faced pulley which is so desirable. In this construction the friction disk 35 is provided with a recessed hub 36 and a collar 37, secured on the shaft 9 by a set screw 38, telescopes within the hub 36. A spring 39 located in the recess in the hub 36 forces the disk 35 yieldingly into engagement with the pulley 30. A plurality of dowel pins project rearwardly from a flange on the collar 37 into holes provided for them in the hub 36 and form a positive driving connection between the collar 37 and the friction disk 35.

The construction illustrated in Figs. 2 and 3 is exactly the same, except that in Fig. 3 the friction disk and the parts that secure it to the shaft 9 have been reversed, so that it drives the shaft 20 in the opposite direction from that in which it rotates this shaft in the arrangement shown in Fig. 2.

In Fig. 4, we have illustrated a still further modified form of drive wherein the friction material is carried by the disk in place of the pulley, this form being an obvious adaptation of the invention. As illustrated in Fig. 4, the spindle 20 carries the pulley 50 formed with a hub 51 adapted to slide upon the spindle 20 and be secured thereto in any desired adjusted position by a set screw 52, the peripheral surface of the pulley being slightly rounded, as indicated at 55. In this form the pulley 50 and its surface 55 are of metal and a cork disk 60 against which the pulley 55 is held, is secured to the flange 61, corresponding to the flange 35 or the disk 31 of the forms above explained. This cork disk 60 is preferably held in position by a ring 62 secured to the flange 61 by a plurality of screws, illustrated at 63, 63. This arrangement is secured to the shaft 9 in a similar manner to that as illustrated in Figs. 2 and 3, corresponding reference characters being applied thereto.

In the various forms illustrated, it will be seen that we have provided, in our various forms, a machine of the Amazeen skiving type adapted to run at high speeds, having a cork faced friction surface between the driving elements, adapted for varying angular adjustment of the driving elements and in a very limited and compact space with a substantially uniform driving contact, irrespective of the angle. In the form shown in Fig. 1, we secure an automatic self-adjustment or self-seating of the cork element and the disk 31 by reason of the yielding of the disk as well as of the yield and resiliency of the surface of the cork 30 on its pulley. These two thus take care automatically of varying angular positions and with substantially equal tension.

In the forms shown in Figs. 2 and 3, the disk is beveled and the yield is substantially taken up by the cork; while in the form shown in Fig. 4 the pulley 50 is so formed as to always be under tension and slightly indenting the cork surface 60 and thus to secure the friction drive at any relative angle with substantially equal tension. Thus a non-slipping, noiseless, driving construction is secured.

Our present invention is further described and defined in the form of claims as follows:

1. In a machine of the class described, a power shaft, a cutter shaft positioned at an angle to said power shaft, means to vary the relative angular adjustment of said shafts, and friction driving mechanism to operatively connect said power shaft and cutter shaft at all positions of their angular adjustment, consisting of a friction disk carried by the power shaft and a cork faced friction pulley on said cutter shaft.

2. In a machine of the class described, a power shaft, a cutter shaft positioned at an angle to said power shaft, means to vary the relative angular adjustment of said shafts, and friction driving mechanism to operatively connect said power shaft and cutter shaft at all positions of their angular adjustment, consisting of a friction disk carried by one shaft and a cork faced friction member on the other shaft.

3. In a machine of the class described, a power shaft, a cutter shaft positioned at an angle to said power shaft, means to vary the relative angular adjustment of said shafts, and friction driving mechanism to operatively connect said power shaft and cutter shaft at all positions of their angular adjustment consisting of a friction disk carried by the power shaft, a collar fixed to said power shaft, yielding means between said collar and said friction disk, and a cork faced pulley on said cutter shaft, said pulley bearing on said friction disk in opposition to the action of said yielding means.

4. In a machine of the class described, a power shaft, a cutter shaft positioned at an angle to said power shaft, means to vary the relative angular adjustment of said cutter shaft and power shaft, and friction driving mechanism to operatively connect said power shaft and cutter shaft at all positions of their angular adjustment consisting in a friction disk carried by the power shaft, a recessed hub carried by said friction disk, a collar fixed to the power shaft, a coiled spring within said hub bearing against said collar and said friction disk permitting a yielding movement of the friction disk toward and from said collar, and a pulley on said cutter shaft bearing on said friction disk in opposition to the action of the spring.

In testimony whereof, I have signed my name to this specification, in the presence of two subscribing witnesses.

W BROOKS GOWDY.
LOUIS G. FREEMAN.

Witnesses:
J. H. HAMNER,
MARY NORTE.